May 8, 1923.  
L. L. MOOTHART  
WAGON BED  
Filed May 25, 1922  
1,454,179  
2 Sheets-Sheet 1
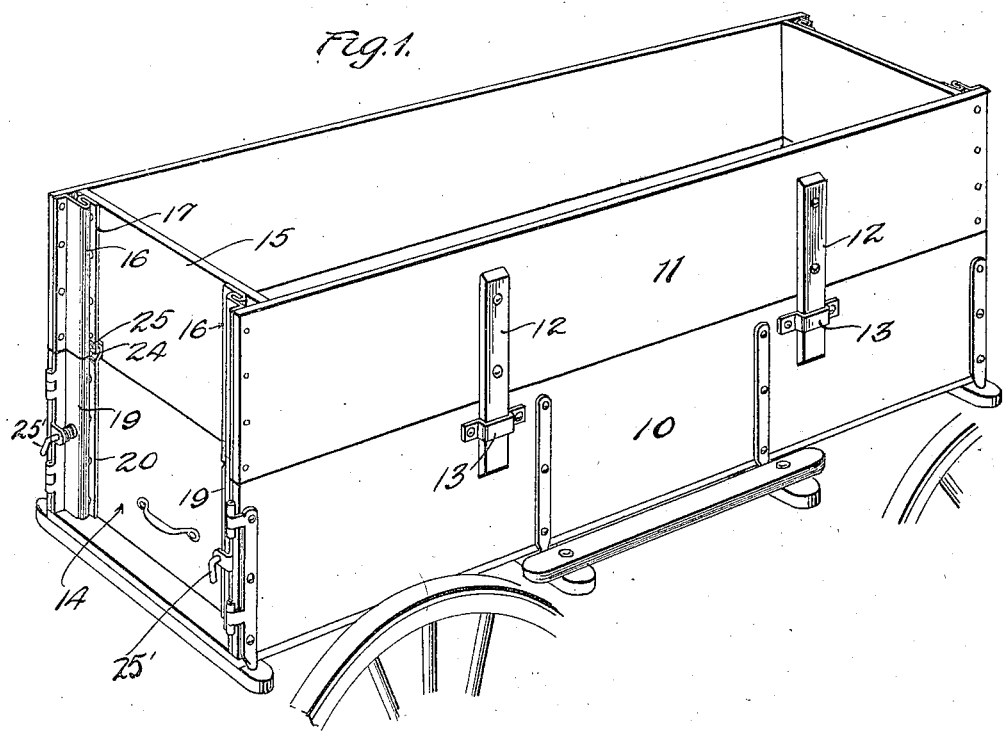
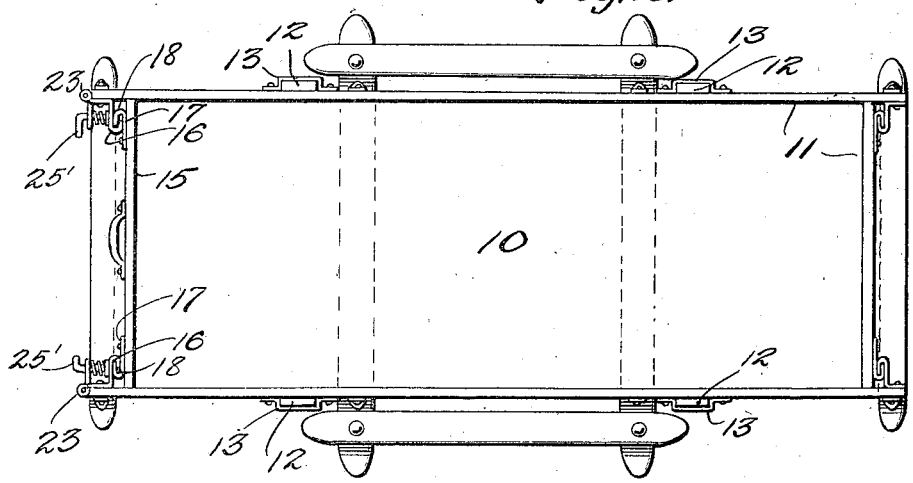
Inventor  
Lyman L. Moothart
By
Attorney May 8, 1923. 1,454,179
L. L. MOOTHART
WAGON BED
Filed May 25, 1922 2 Sheets-Sheet 2
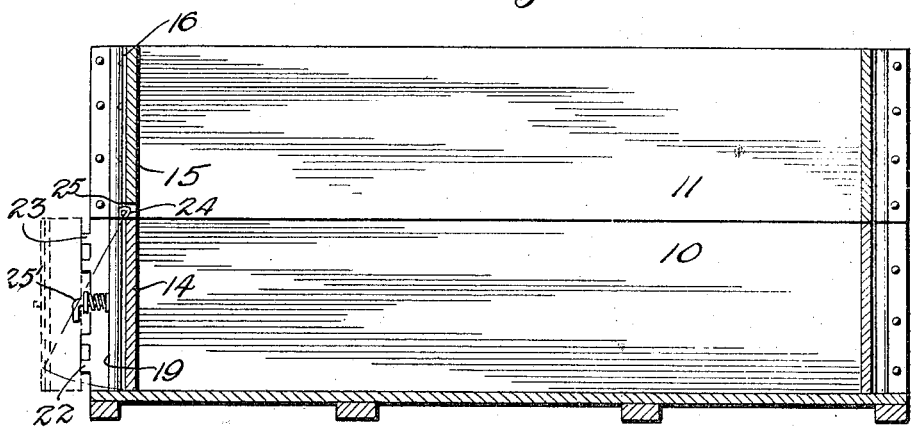
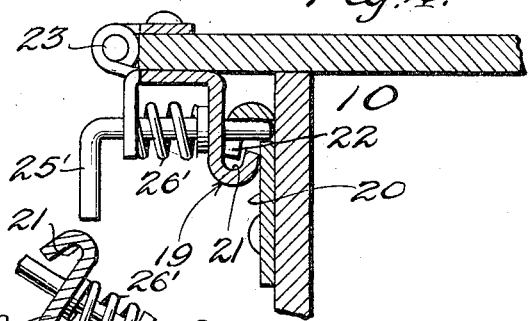
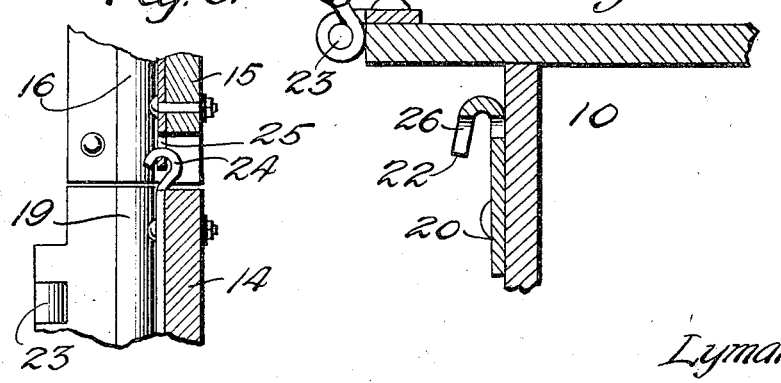
Inventor
Lyman L. Moothart Patented May 8, 1923.

1,454,179

UNITED STATES PATENT OFFICE.

LYMAN L. MOOTHART, OF JUNIUS, SOUTH DAKOTA.

WAGON BED.

Application filed May 25, 1922. Serial No. 563,593.

*To all whom it may concern:*

Be it known that I, LYMAN L. MOOTHART, a citizen of the United States, residing at Junius, in the county of Lake, State of South Dakota, have invented certain new and useful Improvements in Wagon Beds; and I do hereby declare the following to be a full, clear, and exact description of the invention, such as will enable others skilled in the art to which it appertains to make and use the same.

The object of the invention is to provide a wagon body and end gate construction wherein the end gate serves as the transverse tie or brace, whereby spreading of the sides of the body is prevented so that the use of the transverse bracing chains and similar devices are rendered unnecessary and the positioning of the end gate may serve as a means for effectively bracing the body, and more particularly to provide an end gate mounting whereby an interlocking connection is provided between the end gate and the side walls of the wagon body which, while affording an opportunity for sliding movement of the end gate serves to prevent displacement of the side walls of the box; and to provide in connection with an end gate mounting which is adapted to permit sliding movement thereof, a means whereby the lower section of the end gate, or the portion of the end gate representing the back of the main wagon body, may be moved pivotally or swung outwardly to permit of discharging the contents of the wagon body by a dumping or tilting action; and with these objects in view, the invention consists in a construction, combination and relation of parts of which a preferred embodiment is shown in the accompanying drawings, wherein:

Figure 1 is a perspective view of a wagon body embodying the invention.

Figure 2 is a plan view of the same.

Figure 3 is a longitudinal sectional view thereof showing in dotted lines the extended position of the main gate body cleat.

Figure 4 is a horizontal sectional view of the main gate cleats and adjacent portions of the end gate body in the interlocked relation.

Figure 5 is a similar view showing the body cleat extended to permit of swinging movement of the end gate.

Figure 6 is a detail section showing wing joint between the upper and lower tail board members.

The illustrated embodiment of the invention contemplates a main wagon body or box 10, surmounted by a removable rack or extension body 11, secured in position in the ordinary or any conventional way as through the engagement of standards 12, with clips 13. The main wagon body and rack or extension body are provided respectively with end gates 14 and 15, each of which is slidingly fitted in place for removal by upward displacement and is secured at its end edges to the side walls of the body in which it is fitted by means of interlocking cleats. The cleats of the extension body end gate consists of the outwardly directed guide groove or channel members 16, which are secured to the ends of the side members of the extension body 11, and the end gate member 17 having an inwardly directed rib or tongue 18, for engagement with said guide groove or channel and hence forming an interlock therewith by which outward displacement of the side walls of the body with relation to the end gate 15 or with relation to the opposite side wall is prevented. In other words the interlocked relation between the body and the end gate cleats serves as a transverse brace by which the side walls of the body are held against spreading action.

The cleats 19 and 20 for the lower or main body and gate are of similar construction to those described in reference to the extension body and gate in so far as the interlocking feature is concerned, in that the body member 19 is provided with an outwardly directed or facing guide channel or groove 21, for the reception of an inwardly directed rib or tongue 22 on the end gate member to adapt the end gate to serve as a brace to prevent spreading action of the side walls of the main wagon body.

With reference to the main end gate cleats however, there is a difference in construction as compared with those of the end gate for the extension body, in that the body members of the former are hingedly mounted as indicated at 23 upon the side walls of the main wagon body, and are adapted to swing outwardly and rearwardly to remove them from the path of rearward movement of the end gate of the main wagon body, and at its upper edge said main end gate is hingedly mounted by means of hooks 24, engaging eyes 25 at the lower edge of the upper end gate, said hooks being formed on the upper ends of the main end gate cleats 20 and the eyes in the lower ends of the extension end gate cleats 15, so that the main or lower end gate may be swung outward or rearward at its lower edge to permit of the discharge of the contents of the wagon body by a dumping or tilting movement thereof.

The main wagon body cleats 19 are of cross-sectional angular construction to occupy the angles between the inner surfaces of the rear ends of the wagon body sides and the plane of the end gate, and as the hinges are arranged at the extreme ends of the side walls of the body, it will be seen that the swinging movement of the cleat member 19 from the position shown in Figure 5, to that seen in Figure 4, causes the guide channel or groove which is carried by the free wing of the cleat 19 to traverse a forwardly and outwardly directed path, to effect engagement of said channel or groove with the rib or tongue of the end gate cleat 20, when the end gate is in its normal or closed position. Therefore with the parts in the normal position indicated in Figure 1, should it be desired to discharge the contents of the wagon body through a rearward swinging movement of the main body end gate, the body cleats of the main end gate may be swung out of engagement with the end gate cleats and to the inoperative position indicated in Figure 5, to thereby disengage their guide channels or grooves from the ribs or tongues of the end gate cleats and remove the body cleats from the path of the end gate.

In order to prevent displacement of the main body cleats through pressure applied to the end gate from within the wagon body, however, latches 25' in the form of bolts are mounted on the body cleats to engage sockets 26 in the end gate, and are yieldingly held in their engaged positions,—that is when the guide channels or grooves are in interlocking relation with the ribs or tongues, by springs 26'. To release the end gate for swinging movement, it is necessary to disengage the locking bolts or latches and then swing the body cleats to the inoperative position.

Where a similar relation is desired between the front end walls of the main or extension wagon body or both, and the side walls thereof that is to say, with a view to permitting the upward sliding movement or displacement of the front end walls, a similar set of interlocking cleats may be employed as above described, between the rear end gate and the side walls of the extension body. Obviously the special construction of the body cleats as described in connection with the rear end gate of the main body is suitable only and is designed particularly for the rear end of the body for the purpose of permitting the dumping of the contents thereof by tilting movement of the body.

What is claimed is—

1. A wagon body having end gate cleats of which the members are carried respectively by the side walls of the body and the end gate and have an interlocking engagement for sliding movement parallel with the plane of the end gate, one of said cleat members having an outwardly directed channel or groove and the other having an inwardly directed rib or tongue, and the side wall cleat members being hingedly mounted for swinging movement out of the path of the rearward movement of the end gate, and a spring actuated latch or bolt carried by said side wall cleat member for engagement with a socket in the end gate.

2. A wagon body having end gate cleats of which the members are carried by the side walls of the body and the end gate, respectively, and having interlocking engagement for sliding movement parallel with the plane of the end gate, one of said cleats having an outwardly directed channel or groove and the other having an inwardly directed rib or tongue, the second-named cleat having an opening formed therethrough transversely of the rib in a plane at right angles to the end gate, the first-named cleat being hingedly mounted for swinging movement out of the path of the rearward movement of the end gate, and a spring actuated latch or bolt carried by the swingable cleat for engagement in the said opening of the said second-named cleat.

In testimony whereof, I have affixed my signature, in the presence of two witnesses.

LYMAN L. MOOTHART.

Witnesses:
 MARTIN F. BERTHER,
 HORACE O. AUXFRED.